(12) United States Patent
Hattori

(10) Patent No.: US 7,585,572 B2
(45) Date of Patent: Sep. 8, 2009

(54) BALL STUD

(75) Inventor: Hirotaka Hattori, Soja (JP)

(73) Assignee: Kyoritsu Seiki Co., Ltd., Okayama (JP)

( * ) Notice: Subject to any disclaimer, the term of this patent is extended or adjusted under 35 U.S.C. 154(b) by 0 days.

(21) Appl. No.: 11/804,460

(22) Filed: May 18, 2007

(65) Prior Publication Data

US 2008/0286477 A1 Nov. 20, 2008

(51) Int. Cl.
- *B32B 15/00* (2006.01)
- *C03C 29/00* (2006.01)
- *C25D 5/10* (2006.01)
- *B32B 15/01* (2006.01)
- *F16C 11/00* (2006.01)
- *F16D 3/00* (2006.01)
- *F16D 1/00* (2006.01)

(52) U.S. Cl. .................. 428/658; 428/632; 428/666; 428/667; 428/659; 428/680; 428/684; 428/685; 403/91; 403/165; 403/404

(58) Field of Classification Search .......... 428/632, 428/666, 667, 658, 659, 680, 681, 684, 685; 403/91, 165, 404

See application file for complete search history.

(56) References Cited

U.S. PATENT DOCUMENTS

| 2003/0207133 A1* | 11/2003 | Preikschat et al. .......... 428/472 |
| 2004/0197594 A1* | 10/2004 | Suzuki et al. .............. 428/626 |
| 2006/0008668 A1* | 1/2006 | Thomae ...................... 428/615 |

FOREIGN PATENT DOCUMENTS

| GB | 1 143 861 | 2/1969 |
| JP | 5-62726 | 8/1993 |

* cited by examiner

*Primary Examiner*—Timothy M Speer
*Assistant Examiner*—Gordon R Baldwin
(74) *Attorney, Agent, or Firm*—William L. Androlia; H. Henry Koda

(57) ABSTRACT

A ball stud having a ball at one end of a rod-shaped stud. The ball stud comprises: a metal plating film formed on the surface of the stud; and a trivalent chromate film continuously formed over both the surface of the metal plating film formed on the stud and the surface of the ball, whereby rust is inhibited in the boundary of the metal plating film. An externally threaded portion is also coated, if formed in the ball stud, on its surface with the metal plating film and the trivalent chromate film.

4 Claims, 2 Drawing Sheets

BALL STUD

BACKGROUND OF THE INVENTION

1. Field of the Invention

The present invention relates to a ball stud subjected to a rust-inhibiting treatment.

2. Background Art

A ball joint is constituted to include a ball stud having a ball at one end of a rod-shaped stud, and a socket for fitting the ball of the ball stud. The ball stud is, for example, connected to other members in the following manner; the ball is tightly fitted through a resin sheet in the socket and the exposed portion of the stud protruding from the socket is covered with a covering and an externally threaded portion formed at the other end of the stud is fixed to other members. As a result, the ball stud usually has little exposed portion, and need not be rust-proofed. Thus, most ball studs have not been subjected to rust-inhibiting treatment.

In recent years, however, requirements for the specifications have risen to the level requiring rust-inhibiting treatment on the ball stud or at least on the stud portion protruding from the socket. It is conceived that the various rust-inhibiting means known in the prior art, such as means for applying rust-inhibiting paint only to the stud. In this case where the means is the rust-inhibiting paint, the application of the rust-inhibiting paint-exclusively to the stud portion is so difficult as to cause another problem that the ball has to be cleared of the rust-inhibiting paint. Thus, JP05-062726 U has disclosed a technique for continuously forming a resin film over the surface of the stud and the surface of the ball.

In the ball stud of JP05-062726 U, both the surface of the stud and the surface of the ball are continuously coated with a resin softer than that of the resin sheet (in JP05-062726 U referred to as bearing 2) to be fitted in the socket. It is disclosed that the resin film formed on the ball need not be removed to lower the cost for the manufacture. It is also disclosed that the resin film acting to inhibit the rust is softer than the resin sheet in the socket so that the sliding resistance to the ball can be lowered. It is also said that it is possible to improve the qualities of the ball joint constituted by assembling the ball stud with the socket, e.g., the torque transmissivity or the endurability of the ball joint.

SUMMARY OF THE INVENTION

The ball stud of JP05-062726 U, in which the resin film is formed continuously over the surface of the stud and the surface of ball, tends to have its resin film so thickened as cannot be neglected. Although the resin film improves the fastening torque of the externally threaded portion in the stud and the torque transmissivity of the ball joint, these improvements are based on the design considering the thickness of the resin film. This raises a problem that the thickness of the resin film has to be strictly managed in the manufacture process. It is, therefore, conceived that a metal plating film which can be thinner than the resin film is suitable for the rust-inhibiting solutions.

In order to confirm whether or not the rust-inhibiting treatment of the ball stud with the metal plating film was practical, therefore, prototypes were manufactured by forming a zinc-iron (ZnFe) plating film or a zinc-nickel (ZnNi) plating film continuously over the surface of the stud and the surface of the ball. The prototypes were measured on the rotary torques before the endurance tests (in which the ball studs assembled with the ball joints were rocked and rotated under a constant load and in a specified amplitude), the rotary torques after the endurance tests, transverse rigidities after the endurance tests and axial rigidities after the endurance tests. As a result, in all metal plating films, the rotary torques of the prototypes deviated the specification requirements after the endurance test and the some prototypes deviated the specification requirements before the endurance test. It has been found out that the deteriorations of the rotary torques were caused by the degraded surface roughnesses of the balls as a result of forming the metal plating films, and that the metal plating films formed on the balls had to be polished.

Next, focusing on the ball studs having the zinc-nickel films found comparatively satisfactory in the aforementioned test, other prototypes, in which the zinc-nickel plating films formed on the balls were polished, were manufactured. The prototypes were measured on the rotary torques before the endurance tests, the rotary torques after the endurance tests, the transverse rigidities after the endurance test and the axial rigidities after the endurance tests. As a result, the prototypes, in which the zinc-nickel plating films on the balls were not polished, satisfied the specification requirements in the transverse rigidities and the axial rigidities after the endurance tests. However, the prototypes, in which the zinc-nickel plating films formed on the balls were polished, deviated the specification requirements after the endurance tests. This is caused by that the zinc (Zn) was separated from the zinc-nickel plating film thinned by the polish so that the peeled zinc broke the resin sheet.

The zinc of the zinc-nickel plating film seems low in the adhering strength to the iron (Fe) of the main component of the ball stud, and may be separated when the ball of the ball stud rocks or rotates. It is, therefore, conceivable to adopt a metal plating film of another kind accompanied by no component separation. However, an excessively special metal plating film cannot be adopted, considering not only the performance but also the productivity and the cost of the ball stud. Therefore, the formation of the metal plating film over both the surface of the stud and the surface of the ball is practically difficult, which indicate that the metal plating film formed on the ball has to be completely removed.

From another perspective, the metal plating film is easily formed partially on the same members so that the trouble of peeling the metal plating film to be formed on the ball can be omitted by forming a film exclusively on the stud, for example. However, the partial metal plating film on the common metal member causes the problem of the so-called electrolytic corrosion, in which a potential difference is made at the boundary between the portions with and without the metal plating film thereby to develop rust easily. In the ball stud having the metal plating film only on the stud, therefore, the rust-proofing treatment for suppressing the rust development in the boundary of the metal plating film has been studied.

As a result of the study, a ball stud comprising a ball at one end of a rod-shaped stud, and a metal plating film formed on the surface of the stud, and a trivalent chromate film (or a thin film of chromate) continuously formed over both the surface of the metal plating film formed on the stud and the surface of the ball is developed. An externally threaded portion is also coated on its surface with both the metal plating film and the trivalent chromate film in case the externally threaded portion is formed in the ball stud.

The metal plating film prevents generation of red rust on the stud. The trivalent chromate film prevents generation of the red rust and the electrolytic corrosion in the metal plating boundary. Besides, the generation of white rust is prevented in case the metal plating film contains zinc. The trivalent chromate film is usually so thin as 1 micrometer or less so that it dos not obstruct the rocking motion or rotating motion of the ball even if it is formed on the ball surface. Moreover, the trivalent chromate film containing substantially no zinc hardly damages the ball, even if it comes off.

For the trivalent chromate film to become the upper layer, the metal plating film may be exemplified by any of a zinc plating film, a nickel plating film or a zinc-nickel plating film. These metal plating films are not especially limited in their kinds, because they are coated with the trivalent chromate film so that the white rust generation is prevented, as described above. Thus, the ball stud of this invention is advantageous in that the metal plating film can be properly selected while considering the rust-inhibiting requirement and the manufacturing cost of the stud.

The invention has an advantage to provide a ball stud satisfying a high rust-inhibiting requirement without deteriorating the original moving performance based on design values. Both the metal plating film and the trivalent chromate film are thinner than the resin film so that they hardly fluctuate the fastening torque of the externally threaded portion formed in the stud. Especially the trivalent chromate film is so thin that it does not damage the ball, even if it is peeled off, thereby to cause no performance degradation of the rocking motion or rotational motion of the ball. In addition, the trivalent chromate film has no outflow of chromium thereby to cause no problem of the environmental contamination. Thus, the invention can provide a ball stud satisfying the necessary and sufficient rust-inhibiting requirements without deteriorating the intrinsic motion performances and causing the environmental contamination.

DESCRIPTION OF PREFERRED EMBODIMENTS

Figure 1:
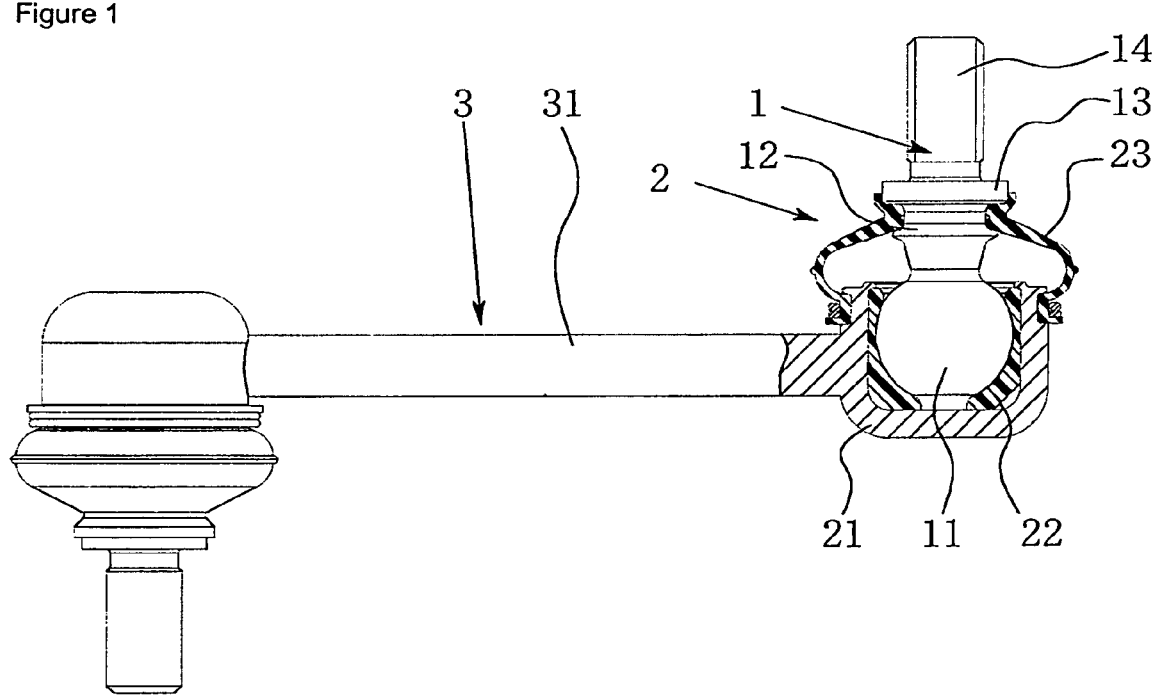
FIG. 1 is a partially broken front elevation showing one embodiment of a ball joint, with which a ball stud according to the invention is assembled.
Figure 2:
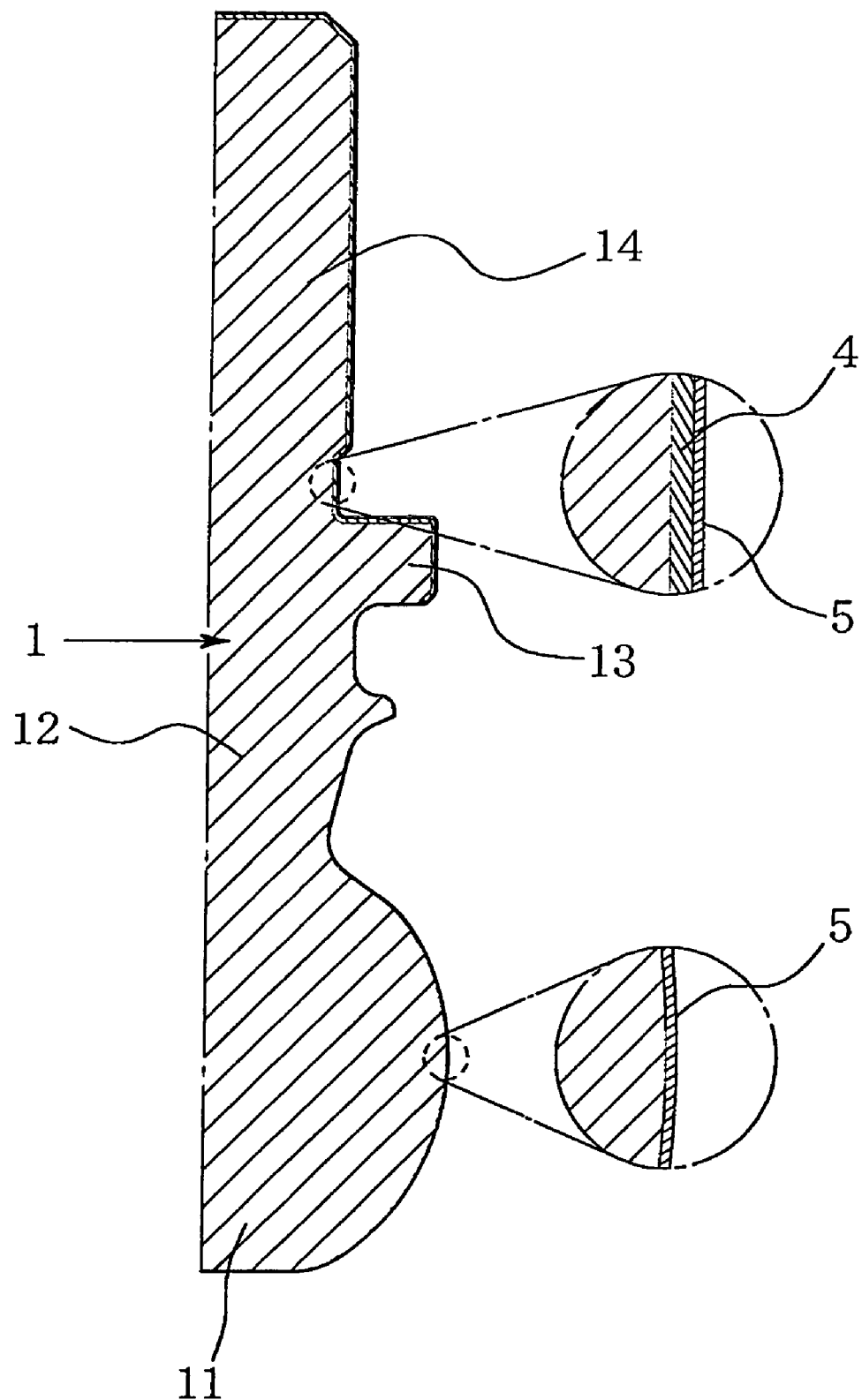
FIG. 2 is a sectional view of the ball stud expressing a relation between a metal plating film and a trivalent chromate film.

An embodiment of the invention is described in the following with reference to the accompanying drawings. FIG. 1 is a partially broken front elevation showing one embodiment of a ball joint 2, with which a ball stud 1 according to the invention is assembled. FIG. 2 is a sectional view of the ball stud 1 expressing a relation between a metal plating film 4 and a trivalent chromate film 5. For conveniences of description, the metal plating film 4 and the trivalent chromate film 5 are shown thicker in FIG. 2.

In the ball stud 1 according to the invention, as shown in FIG. 1, the ball joint 2 is constituted in the following manner. In a metallic socket 21 disposed at one end of a joint bar 31 of a stabilizer link 3, there is fitted a resin sheet 22, which has an inner face patterning of the metallic socket 21 on its outer face and has an outer face patterning of the ball 11 of ball stud 1 on its inner face. The ball 11 is tightly fitted in the socket 21 through the above-said resin sheet 22. A stud 12 is covered, at and below its upper flange portion 13 protruding from the socket 21, with a rubber cover 23. The stud 12 is externally threaded, as indicated by 14, at its portion protruding from the cover 23, and another part like a mounting bracket of a lower arm (not-shown) is connected to that externally threaded portion 14.

In the ball stud 1 of this embodiment, as shown in FIG. 2, the metal plating film 4 is formed on the upper half of the stud 12 namely, from the externally threaded portion 14 to the upper flange portion 13 for mounting the cover 23, and the trivalent chromate film 5 is formed all over the stud 12, namely, from the externally threaded portion 14 via the upper flange portion 13 to the ball 11. In other words, the relatively thick two layered rust-inhibiting film composed of the metal plating film 4 and the trivalent chromate film 5 is formed on such an upper portion of the ball stud 1 as contains the upper flange portion 13, and the relatively thin one layered rust inhibiting film containing the trivalent chromate film 5 is formed on such a lower portion of the stud 12 as contains the portion below upper flange portion including the ball 11. The metal plating film 4 has a thickness of 6 micrometer to 15 micrometer, and the trivalent chromate film 5 has a thickness of about 1 micrometer at the most.

The metal plating film 4 and the trivalent chromate film 5 are formed by using various means previously known in the arts. For example, the metal plating film 4 is formed by holding the ball stud 1 on the sides of the ball 11 so that the ball stud 1 is inverted upside down (that is, in the position inverted from the position shown in FIG. 2), and the ball stud 1 is dipped in the plating liquid of the bath to the depth of upper flange portion. After the metal plating film 4 was formed, the ball stud 1 is dipped in its entirety in the chromate liquid thereby to form the trivalent chromate film 5 all over the entirety including the ball 11. In the prior art adopting neither metal plating film 4 nor the trivalent chromate film 5, the oil is applied to the entirety of the ball stud manufactured, considering the rust inhibition till the assembly. The ball stud 1 of the invention is advantageous in that it can be shipped as soon as the trivalent chromate film 5 is formed.

EXAMPLES

It was examined whether or not the ball stud according to the invention could satisfy the specification requirements and could achieve necessary and sufficient rust-inhibiting performances. For these examinations, Example 1 to Example 3 were manufactured and measured on the rotary torques before endurance tests (i.e., the tests, in which the ball studs assembled with the ball joints were rocked and rotated under constant loads in a specified amplitude), on the rotary torques after the endurance tests, transverse rigidities after the endurance tests and axial rigidities after the endurance tests. Example 1 to Example 3 were also measured on ball surface roughnesses, ball diameter variations, and thickness variations of resin sheets to fit the balls, both before and after the endurance tests.

Constitutions of Examples

In Example 1 to Example 3, the common metal plating film (i.e., the zinc-nickel film) and the common trivalent chromate film were formed on the ball stud having the contour shown in FIG. 1 and FIG. 2. The used ball stud was made of SCM 435, and cut to integrate the ball having a diameter of 20 mm and the stud having a length of 67 mm (including the externally threaded portion). In Example 1 to Example 3, the zinc-nickel plating film having a thickness of 8 micrometer was formed to the upper flange portion to which the cover was mounted, and the trivalent chromate film having a thickness of 1 micrometer or less was formed on the entirety containing the ball. The resin sheet in the socket to fit the ball was made of polyacetal. In the endurance tests to be described hereinafter, the stabilizer links were constituted, as exemplified in FIG. 1. The ball stud at one end (for example, the left one of stabilizer link in FIG. 1) was connected to a hydraulic tester generating vibration, and the rocking motions and the rotating motions were applied to the ball stud on the floating other end (for example, the right one of the stabilizer link in FIG. 1).

[Endurance Tests]

Endurance tests made on Example 1 to Example 3 are tabulated in Table 1. In Example 1, the endurance tests of loads of ±3.5 kN, a frequency of 10 Hz, rocking angles of ±20 degrees, rotary angles of ±30 degrees and a cycle number of 800,000 were executed under the condition of an ambient temperature of −30° C. In Example 2, the endurance tests of loads of ±2.0 kN, a frequency of 13 Hz, rocking angles of ±2 degrees, rotary angles of ±2 degrees and a cycle number of 3,000,000 were executed under the condition of an ambient temperature of 70° C. In Example 3, the endurance tests of loads of ±3.5 kN, a frequency of 10 Hz, rocking angles of ±20 degrees, rotary angles of ±30 degrees and a cycle number of 800,000 were executed under the condition of an ambient temperature of 70° C.

TABLE 1

|  | Load | Frequency | Rocking Angle | Rotary Angle | Cycle Number | Ambient Temp. |
| --- | --- | --- | --- | --- | --- | --- |
| Ex. 1 | ±3.5 kN | 10 Hz | ±20 deg. | ±30 deg. | 800,000 | −30° C. |
| Ex. 2 | ±2.0 kN | 13 Hz | ±2 deg. | ±2 deg. | 3,000,000 | 70° C. |
| Ex. 3 | ±3.5 kN | 10 Hz | ±20 deg. | ±30 deg. | 800,000 | 70° C. |

[Specification Requirement Measurements]

Measurement results of the rotary torques before the endurance tests, the rotary torques after the endurance tests, the transverse rigidities after the endurance tests and the axial rigidities after the endurance tests made on Example 1 to Example 3 are tabulated in Table 2. Table 2 tabulates only the measured values of the ball stud on the rocking side (i.e., the ball stud at the other end of the floating stabilizer link) but not of the ball stud on the loading side (i.e., the ball stud at one end of the stabilizer link connected to the hydraulic tester). As a result of the measurements, it was confirmed that any of Example 1 to Example 3 sufficiently satisfied the specification requirements, and had no problem as products.

TABLE 2

|  | Before Endurance Test | | After Endurance Test | | | | | |
| --- | --- | --- | --- | --- | --- | --- | --- | --- |
|  | Rotation Torque | | Rotation Torque | | Transverse Rigidity | | Axial Rigidity | |
|  | Start | Steady | Start | Steady | ±0.2 kN | ±1.0 kN | ±0.2 kN | ±1.0 kN |
| Ex. 1 | 3.80 kN | 2.50 kN | 1.05 kN | 0.95 kN | 0.025 mm | 0.100 mm | 0.010 mm | 0.030 mm |
| Ex. 2 | 2.25 kN | 2.10 kN | 1.20 kN | 1.15 kN | 0.025 mm | 0.110 mm | 0.010 mm | 0.030 mm |
| Ex. 3 | 2.95 kN | 2.35 kN | 0.10 kN | 0.55 kN | 0.0035 mm | 0.140 mm | 0.020 mm | 0.075 mm |

[Ball Surface Roughness Measurements]

The ball surface roughnesses of the ball studs were measured to verify the variations of the trivalent chromate films in addition to the said endurance tests and the specification requirement measurements. Example 3 was not measured on the ball surface roughness of the ball on the loading side after the endurance tests, because troubles occurred during the endurance tests. The measuring method accords to JIS BB 0601. The measurement results are tabulated in Table 3. Although the numerical values were slightly dispersed in their increases or decreases, they were confined within the range to sufficiently satisfy the specification requirements, and no abnormal appearance was found. Thus, it was confirmed that any of Example 1 to Example 3 raised no problem as the products.

TABLE 3

|  |  | Before Endurance Test | After Endurance Test |
| --- | --- | --- | --- |
| Ex. 1 | Rocking Side | 0.24 | 0.16 |
|  | Loading Side | 0.20 | 0.28 |
| Ex. 2 | Rocking Side | 0.18 | 0.18 |
|  | Loading Side | 0.26 | 0.30 |
| Ex. 3 | Rocking Side | 0.28 | 0.18 |
|  | Loading Side | 0.24 | — |

Numerical Value: Ra

[Ball Diameter Variation Measurements]

Next, the variations of the ball diameters were measured. The measurement results are tabulated in Table 4. The measurements were made on the diameters of the balls in orthogonal directions of an X-direction and a Y-direction with a micrometer. Example 3 was not executed on the measurements of the ball diameters on the loading side after the endurance tests, because troubles occurred during the endurance tests. The measurement results are tabulated in Table 4. Although the numerical values were slightly dispersed in their increases or decreases, they were confined within the range to sufficiently satisfy the specification requirements, and no abnormal appearance was found. Therefore, it was confirmed that any of Example 1 to Example 3 raised no problem as the products.

TABLE 4

|  |  | Before Endurance Test | | After Endurance Test | |
| --- | --- | --- | --- | --- | --- |
|  |  | X | Y | X | Y |
| Ex. 1 | Rocking Side | 20.013 | 20.017 | 20.019 | 20.018 |
|  | Loading Side | 20.024 | 20.022 | 20.021 | 20.021 |
| Ex. 2 | Rocking Side | 20.009 | 20.024 | 20.018 | 20.008 |
|  | Loading Side | 20.018 | 20.018 | 20.014 | 20.013 |
| Ex. 3 | Rocking Side | 20.004 | 20.008 | 20.006 | 20.003 |
|  | Loading Side | 20.011 | 20.013 | — | — |

Unit: mm

[Resin Sheet Thickness Variation Measurements]

In order to confirm the influences of the ball having the trivalent chromate film formed upon the resin sheet, on the other hand, measurements were made on the thickness variations of the resin sheet. The thicknesses of the resin sheet were measured at the intervals of 90 degrees in the circumferential direction, i.e., in A-direction, B-direction, C-direction and D-direction with a micrometer. Example 3 was not executed on the measurements of the thicknesses of the resin sheets after the endurance tests, because troubles occurred during the endurance tests. The measurement results are tabulated in Table 5. Although the numerical values were slightly dispersed in their increases or decreases, they were confined within the range to sufficiently satisfy the specification requirements, and no abnormal appearance was found. Therefore, it was confirmed that any of Example 1 to Example 3 raised no problem as the products.

TABLE 5

| | | Resin Sheet Thickness | | | |
|---|---|---|---|---|---|
| | | A | B | C | D |
| Ex. 1 | Rocking Side | 1.491 | 1.500 | 1.485 | 1.482 |
| | Loading Side | 1.474 | 1.492 | 1.501 | 1.492 |
| Ex. 2 | Rocking Side | 1.509 | 1.494 | 1.503 | 1.465 |
| | Loading Side | 1.481 | 1.474 | 1.500 | 1.492 |
| Ex. 3 | Rocking Side | 1.470 | 1.484 | 1.510 | 1.481 |
| | Loading Side | — | — | — | — |

Unit: mm

[Rust-Inhibiting Performance Evaluations]

Finally, saline solution atomization tests (JIS Z 2371) were executed to evaluate the rust-inhibiting performance, a main aim of the invention. Example 4 to be evaluated was equivalents of Example 1 which was not undergone the aforementioned endurance tests of Example 1. The saline solution atomization tests were also executed on the equivalent of Example 4 having no rust-inhibiting treatment, hereafter referred to as Comparison, for comparison. The testing conditions were: the specific gravity of the saline solution surface liquid of 1.03; the pH of 6.5; the exposure temperature in the atomization chamber of 35±2° C.; the atomization of 1.5 mL/80 cm$^2$/hr; and the atomization period of continuing 1 hr. As a result, Example 4 was not found especially abnormal, but red rust was confirmed in Comparison. As a result of this experiment, the rust-inhibiting performance of Example 4 was confirmed.

What is claimed is:

1. A ball joint (2) comprising a ball stud (1) and a metallic socket (21), wherein:
    a ball stud (1) is made of steel and comprises a rod-shaped stud (12),
    a ball (11) is provided at one end of the rod-shaped stud (12),
    a metal plating film (4) is formed only on the surface of the stud (12);
    a trivalent chromate film (5) is continuously formed over both the surface of the metal plating film (4) formed only on the surface of the stud (12) and the surface of the non-plated ball (11),
    the metallic socket (21) is provided inside with a resin sheet (22) and the ball (11) of the ball stud (1) is fitted over with a resin sheet (22), and
    by forming the trivalent chromate film (5), generation of electrolytic corrosion at the boundary of the surface of the metal plated stud (12) and the surface of the non-plated ball (11) is prevented without preventing a smooth sliding motion between the ball (11) and the resin sheet (22).

2. The ball joint (2) according to claim 1, wherein the metal plating film (4) is a zinc plating film.

3. The ball joint (2) according to claim 1, wherein the metal plating film (4) is a nickel plating film.

4. The ball joint (2) according to claim 1, wherein the metal plating film (4) is zinc-nickel plating film.

* * * * *